United States Patent [19]
Graham et al.

[11] 3,768,136
[45] Oct. 30, 1973

[54] COVER APPLICATOR FOR BOTTLES

[75] Inventors: Robert H. Graham, Spokane, Wash.; John R. Wilson, Golden, Colo.

[73] Assignee: R. A. Pearson Company, Spokane, Wash.

[22] Filed: June 23, 1972

[21] Appl. No.: 265,562

[52] U.S. Cl. .............................................. 29/208 B
[51] Int. Cl. ............................................ B23p 19/04
[58] Field of Search ...................... 29/208 B, 211 R, 29/208 R, 208 C, 211 D

[56] References Cited
UNITED STATES PATENTS

| | | | |
|---|---|---|---|
| 1,875,110 | 8/1932 | Myers | 29/208 B |
| 1,971,576 | 8/1934 | Nelson | 29/211 R X |
| 2,852,899 | 9/1958 | Murrell | 29/208 B |
| 3,267,566 | 8/1966 | Ouellette | 29/208 B |
| 3,360,843 | 1/1968 | Pearson | 29/208 B |

*Primary Examiner*—Thomas H. Eager
*Attorney*—Greek Wells et al.

[57] ABSTRACT

An apparatus for removing tapered covers from a horizontal nested stack and subsequently placing the covers over the upright necks of a pre-positioned group of bottles. The apparatus includes means for directing bottles in single file from a conveyor and successively stopping the bottles in groups of pre-determined numbers directly below a complementary number of angular chutes. A shuttle carriage is operated to grip individual covers from the horizontal nested stacks, move them horizontally to a position above the chutes, and subsequently release them to slide down the chutes and onto the bottles below.

13 Claims, 15 Drawing Figures

COVER APPLICATOR FOR BOTTLES

BACKGROUND OF THE INVENTION

The instant invention relates generally to apparatus for placing cover over objects complementary in configuration to the cover shape and more particularly to apparatus for placing collars or covers over the tops of bottles.

In the bottling industry and especially in the wine bottling industry, conical collars and foil covers are often placed over bottle necks for decorative or advertising purposes. The collars or covers are generally supplied in nested stacks. The process involved in removing individual collars or covers from the stacks and placing them over the necks of bottles has been attempted both by hand and machine. It has been found however that placement by manual operations is relatively slow and costly.

Prior, related apparatus for placing collars over bottles are disclosed in the following U. S. Pat.:
R. A. Pearson, No. 3,360,843
C. P. Ouellette, No. 3,267,566
C. B. Nelson, No. 1,971,576
H. S. Murrell, No. 2,852,899
L. Myers, No. 1,875,110.

The prior Pearson patent discloses a label machine for placing labels of a tapered sleeve configuration over the necks of bottles. Individual labels are taken from nested stacks by pivotable suction arms and moved, in an arc, onto the necks of a pre-positioned group of bottles.

The Ouellette patent discloses a bottle collar applying machine in which individual bottle collars are taken from an incliend nested stack and placed on upright bottle necks by a suction cup mounted to a complex collar transfer mechanism. The apparatus is designed to apply collars to bottles one at a time, halting each bottle momentarily as the collar is applied.

The Nelson, Murrell, and Myers Patents all disclose apparatus for handing only collars having both ends open to enable their placement on a core member for collar feed purposes. Obviously these machines could not place conical covers having only one open end over bottle necks.

The present invention is designed to simultaneously place collars or covers having one closed end over the necks of a prepositioned group of bottles. The apparatus includes means for moving individual collars or covers from horizontal nested stacks to a guide means where they are released to gravitationally slide onto the bottles below. Since the covers or collars are moved along a horizontal path, no complex linkage must be used. Further, the design of the apparatus facilitates simultaneous, multiple placement of the collars or covers over corresponding numbers of bottles, thereby increasing speed of operaton over the above cited art.

SUMMARY OF THE INVENTION

An apparatus is described for placing individual tapered circumferential covers over the upper ends of upright bottles or similarly shaped objects. The apparatus includes means for positioning an individual bottle in an upright condition at a location directly below an article directing means. Individual articles are grasped, and moved outwardly from a horizontally nested stack by a gripping means which moves the articles over the directing means. The gripping means shuttles horizontally from the nested stack to a position above the guide means where it releases the cover onto the directing means, then subsequently moves back to grip the next successive cover in the stack. After a cover has been withdrawn, the stack is advanced an increment by a cover supply means. The advance increments are substantially equal in length to the exposed ends of the covers in the nested stack. The covers, after release from the gripping means are guided by the directing means gravitationally downwardly onto the bottles.

A first object of my invention is to provide a cover applicator for bottles which will automatically place the covers over the bottles.

An additional object is to provide such an applicator that is considerably faster in operation than previous machines or manual methods of application by presenting capability of applying a number of covers simultaneously to a like number of bottles.

A further object is to provide such an applicator that is relatively simple in construction and thereby inexpensive and relatively maintenance free.

A yet further object is to provide such an applicator that requires little or no adjustment to accommodate bottles of different size.

Another object is to provide such an applicator that may be operated adjacent an existing single file bottle conveyor thereby requiring little if any remodelling of existing systems to facilitate its installation.

These and other objects and advantages will become evident upon reading the following disclosure taken within the accompanying drawings which illustrate a preferred form of the invention.

DESCRIPTION OF A PREFERRED EMBODIMENT

Figure 1:
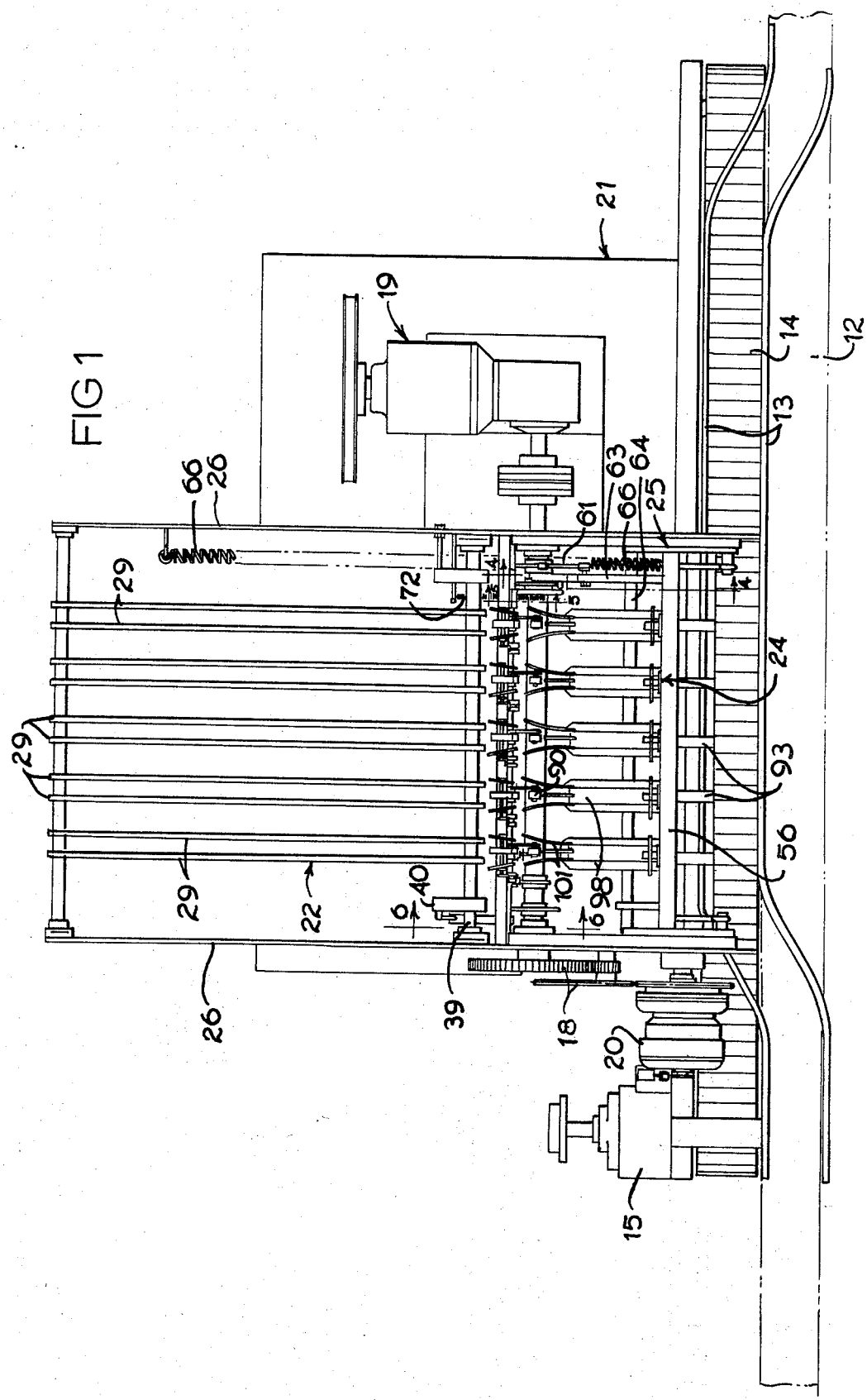
FIG. 1 is a plan view of the cover applicator installed adjacent a longitudinal section of a single file bottle conveyor which is shown in dashed lines.

Referring now to the drawings in more detail, the apparatus comprising a preferred form of the invention is illustrated for use in placing individual tapered circumferential covers or capsules 10 (FIG. 15) over the necks of bottles 16. It should be noted that though the apparatus illustrated is described in terms of capsules 10 placed over bottles 16, the invention is not restricted to that particular use. It will become obvious in the following description and particularly in the appended claims that the invention may be efficiently utilized in other related fields.

Figure 15:
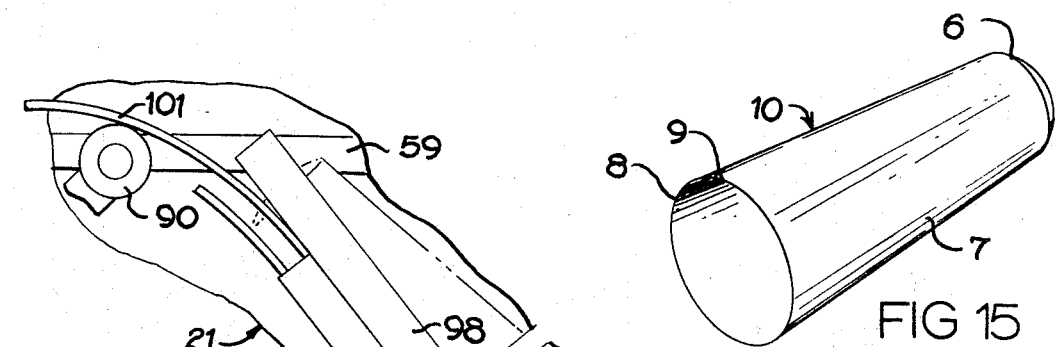
FIG. 15 is an axonometric view of a cover.

FIG. 15 of the drawings illustrates a capsule 10 of the type used to cover the tops of wine bottles. Capsules 10 are generally constructed of metal foil in the form of a frustum, the small end 6 of which is enclosed. Flared walls 7 extend to an open circumferential edge 8 at the large end 9 of each capsule 10.

Figure 14:
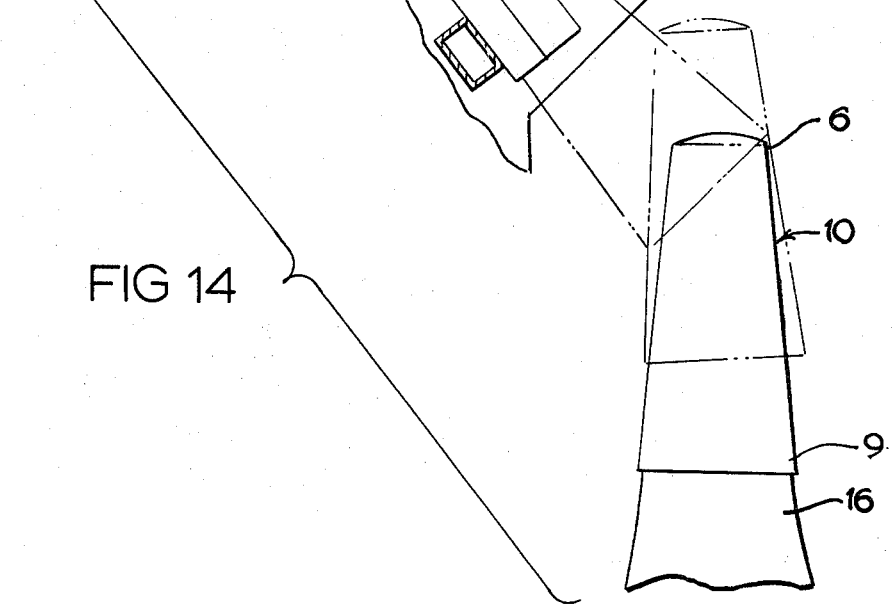

Capsules 10 are utilized in the wine bottling industry and to a certain degree in the beer bottling industry to cover the tops of bottles for protection of the bottle caps and for decorative or advertising purposes. A capsule 10 is loosely placed over the upper conical end of a bottle 16 as seen in FIG. 14, then subsequently crimped about the covered portion of the bottle neck. Usually no adhesive is applied to either the capsule or botle to insure a tight bond since a glued paper collar is generally placed in an overlapping relationship between the capsule and bottle to affect such results.

Capsules 10, when used in conjunction with the present apparatus, are taken individually from horizontal nested stacks shown partially in FIGS. 10–14. The stacks are formed by a plurality of capsules 10 inserted one in another, with the enlarged ends 9 exposed and spaced substantially equally from one another.

Figure 2:
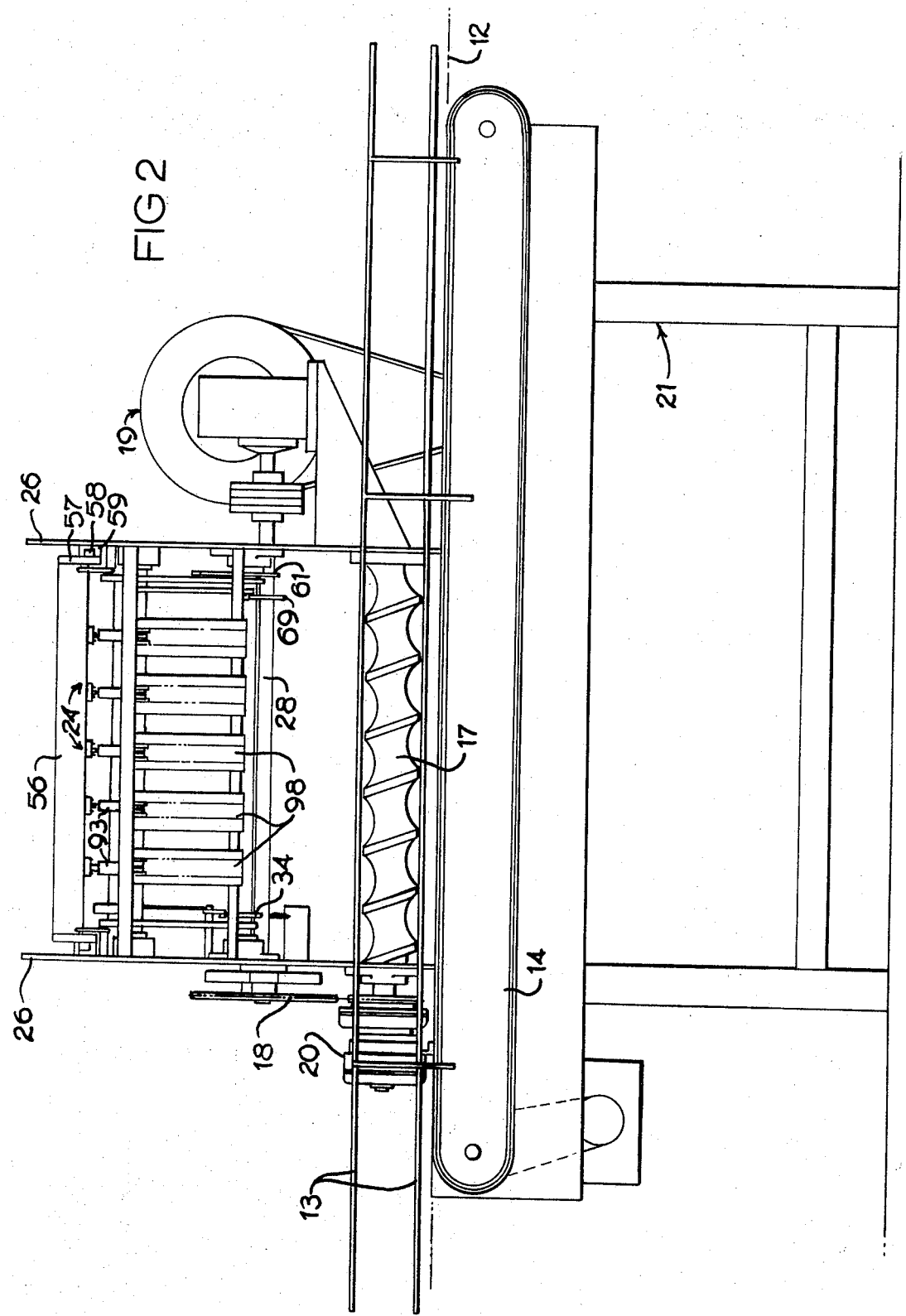
FIG. 2 is a front elevation view of the applicator.
Figure 3:
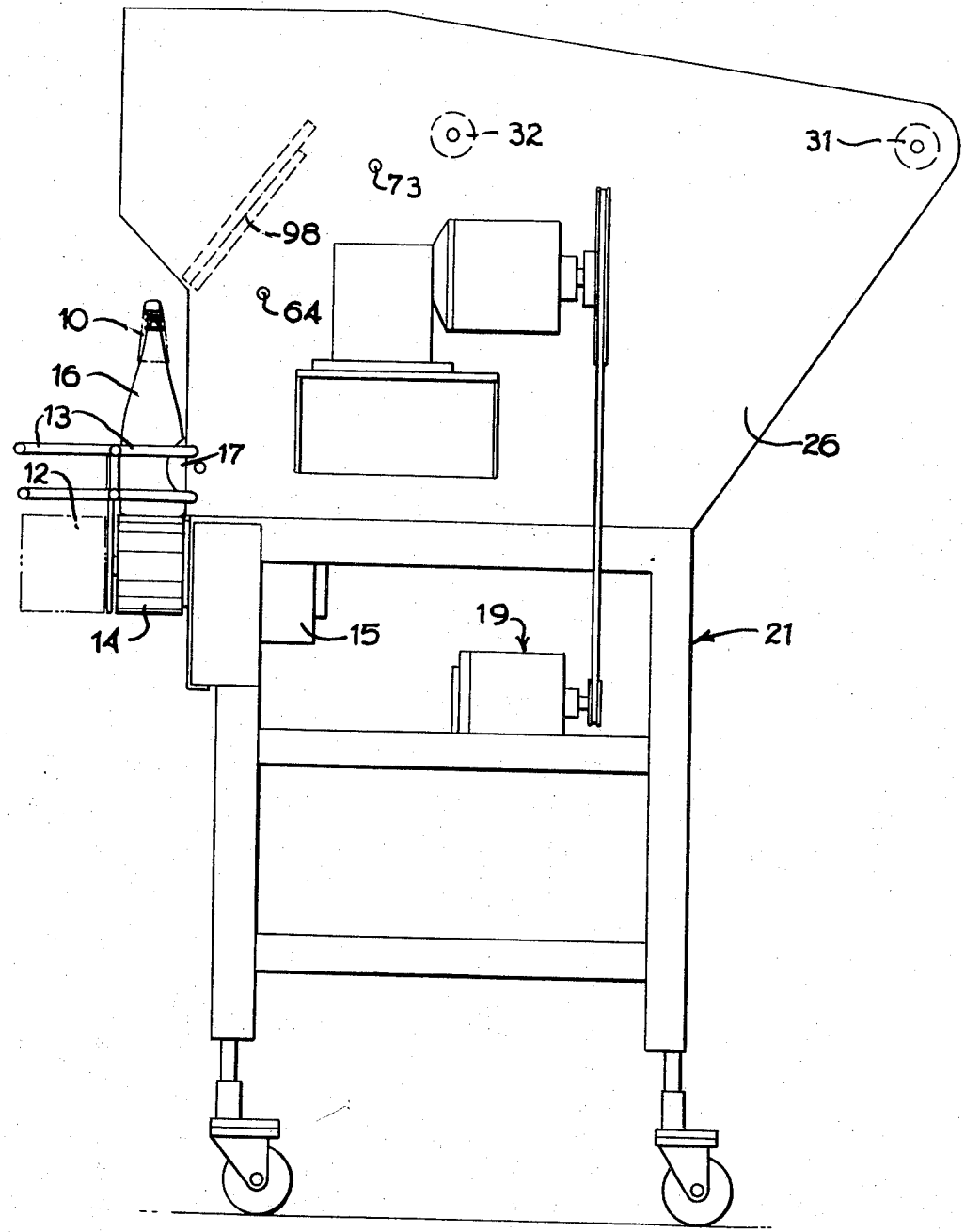
FIG. 3 is an elevational side view of the applicator as seen from the right in FIG. 2.

Looking now to FIG. 2 of the drawings, the apparatus of the present invention, hereinafter referred to as a capsule applicator, may be seen installed on a supporting framework 21 adjacent a single file bottle conveyor 12. Such bottle conveyors are typical to the bottling industry and are utilized to move upright bottles from one process to another in a relatively continuous single file procession.

Bottles are removed from conveyor 12, held stationary for placement of capsules 10, and subsequently moved back onto conveyor 12 through operation of a bottle locating and indexing means. The means basically comprise a pair of longitudinal guide rods 13, a second conveyor 14, and a powered intermittently rotating feed worm 17.

Guide rods 13 direct bottles from conveyor 12 onto the upper horizontal flight of second conveyor 14. An electric motor 15 (FIG. 1) powers conveyor 14 to continuously move about a course parallel and in the same direction as that of conveyor 12.

Guides 13 direct the bottles into engagement along their sides by an elongated feed worm 17, an integral part of the bottle indexing means. Worm 17 is journaled for rotation about a horizontal axis between spaced transverse side plates 26 of supporting framework 21. A clutch and brake assembly 20 is operatively mounted to one end of worm 17 and powered through a drive linkage 18 by a central drive unit 19 and drive shaft 28.

A pair of limit switches are operated by simple complementary cams (not shown in the drawings) on drive shaft 28 to alternately operate clutch and brake assembly 20 to start and stop rotation of worm 17. One cam and associated switch operate the clutch of assembly 20 to engage and rotate worm 17. The number of revolutions of worm 17 is limited to the amount required to move a selected number of bottles engaged thereby to pre-selected positions by the second cam and corresponding limit switch. The second cam and switch operate the brake of assembly 20 to stop rotation of the worm 17. The bottles are held stationary in the pre-set positions, with conveyor 14 frictionally sliding below, until the first cam and switch again operate the clutch of assembly 20 to rotate worm 17.

It should be noted at this time that the rotation of worm 17 simultaneously represents the first and last operational sequence of the capsule placing operation of the present invention. Capsules are placed on the positioned bottles while worm 17 is stationary. Subsequently, when assembly 20 is activated to rotate worm 17, the covered bottles are discharged, guided back onto conveyor 12 by rods 13, and a new group of bottles are engaged simultaneously and moved to the preselected positions. It may be understood, then, that the progress of the bottles along the conveyors 12 and 14 is halted only during the brief operational sequence involving placement of capsules 10 over the positioned bottles.

Capsules 10 are placed over the bottles held stationary at the pre-selected capsule receiving locations through sequential operation of a capsule supply means, a capsule gripping means, and a capsule directing means.

Figure 6:
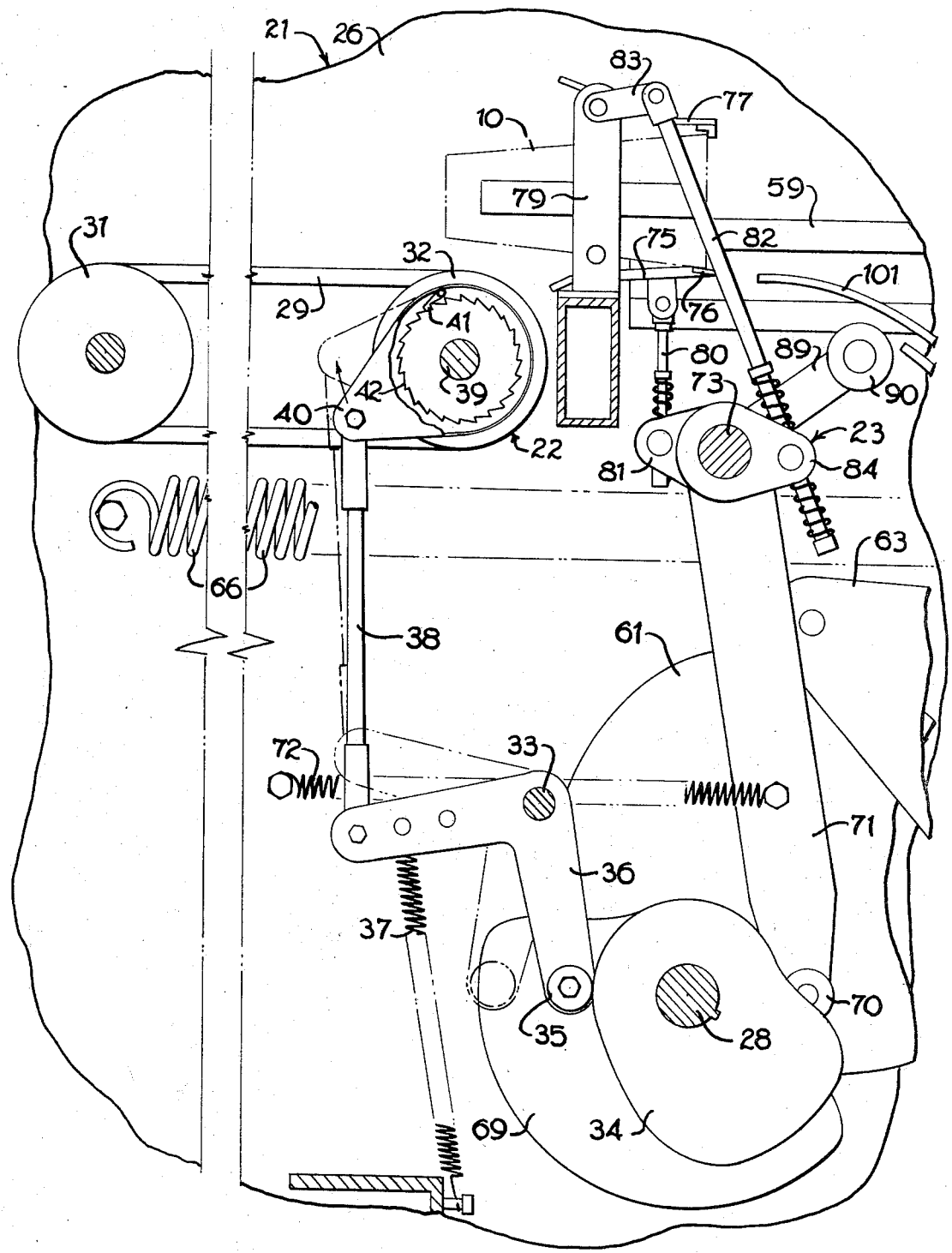
FIG. 6 is an enlarged fragmentary sectional view taken along line 6—6 in FIG. 1.

The capsule supply means basically includes a capsule supply conveyor assembly 22 (FIGS. 2 and 6) and means attached thereto for indexing horizontal nested stacks of capsules inwardly toward the waiting bottles.

The nested stacks of capsules each rest between the upper flights of a longitudinally spaced pair of belts 29 of assembly 22. Belts 29 move about a transverse course, with respect to conveyors 12 and 14, defined by an idler pulley 31 and drive pulley 32.

Belts 29 are driven inwardly in timed increments by a cam 34 rigidly fixed to central drive shaft 28. A follower 35 (FIG. 6), rotatably mounted to one end of an L-shaped crank arm 36, is biased against the cam surface by a tension spring 37 for pivotal movement about a stationary pivot pin 33. As cam 34 rotates, crank 36 is forced to pivot between an inward position, shown by dashed lines, and an outward position as sown by solid lines.

A connecting rod 38 is pivotably mounted between the other free end of crank 36 and a freely pivotable ratchet housing 40. Housing 40 is pivotably mounted on a drive shaft 39 which also rigidly supports drive pulley 32 and a ratchet wheel 42 for rotation therewith. A pawl 41 is pivotably fixed to housing 40 to engage and rotate the enclosed ratchet wheel 42 as cam 34 forces crank 36 to the outward position. The drive pulley 32 is thereby partially rotated to index the nested stack of capsules 10 on belts 29 forwardly a distance substantially equal to the space between two adjacent edges 8 of the nested capsules. Cam 34 is angularly indexed on central drive shaft 28 to insure movement of the capsules in timed relation to the operation of the capsule gripping means.

The capsule gripping means includes a series of capsule clip assemblies 24 facing the nested stacks of capsules 10 and fixed to a shuttle carriage 25. Clips 24 are operated to successively grip the innermost capsules 10 of the nested stacks. The capsules are then pulled free of the stacks, moved inwardly and subsequently released onto the capsule guide means.

Figure 7:
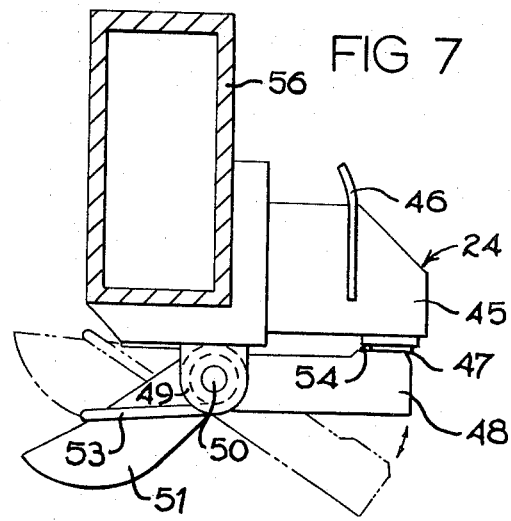
FIG. 7 is an enlarged detailed side view of a typical clip assembly.
Figure 8:
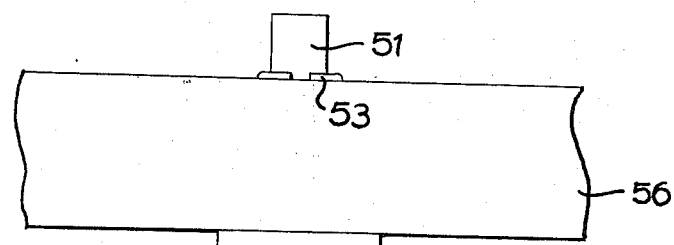
FIG. 8 is a plan view of the clip assembly shown in FIG. 7.
Figure 9:
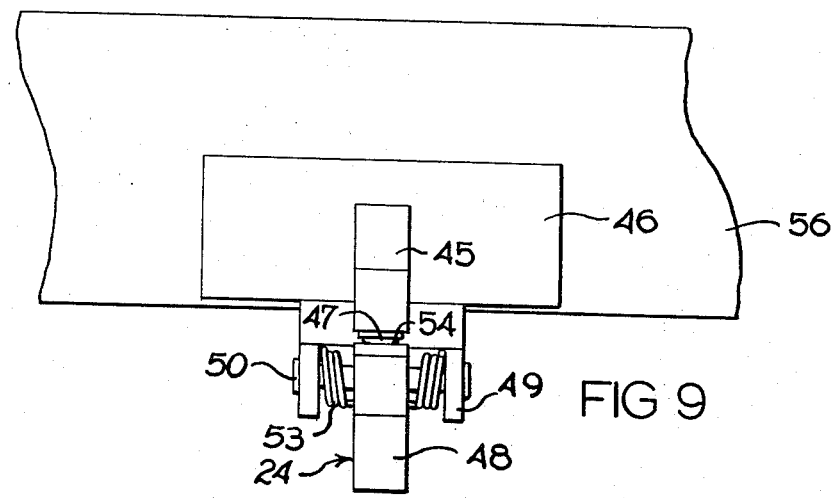
FIG. 9 is a frontal view of the clip assembly as seen from the right in FIG. 7.

Each clip assembly 24 (FIGS. 7, 8, and 9) is designed to grip a capsule wall 7 adjacent the open inwardly facing end 9 between an upper stationary clip member 45 and a lower pivotable clip member 48. A friction pad 47 is provided on upper member 45 for frictionally engaging the inside of a capsule wall 7 while a corresponding surface 54 on lower member 48 engages the outside. Lower clip member 48 is pivotably mounted by a bracket 49 and pivot pin 50 to upper member 45. A torsion spring 53 is mounted between members 45 and 48 on pivot pin 50 to normally bias surface 54 upwardly against friction pad 47. An inwardly extending lever arm 51 of member 48 is utilized to pivot member 48 to an open position as shown in dashed lines in FIG. 5. The opening and closing of member 48 is essential to capsule gripping and releasing operations which will be described in more detail below.

Clip assemblies 24 are carried on a longitudinal elongated clip bar 56 of carriage 25. The ends of bar 56 are rigidly fixed to carriage side members 57 (FIG. 4), each of which freely rotatably journals a transversely spaced pair of rollers 58. Horizontally oriented tracks 59 are mounted on frame side plates 26 to receive rollers 58. The carriage 25 and attached clip assemblies 24 are thereby supported on tracks 59 for reciprocating movement along a horizontal path between an outward extended capsule gripping position and an inward retracted, capsule releasing position.

The reciprocating movement of carriage 25 is originated from rotation of shaft 28 to which an eccentric drive cam 61 is attached. A follower 62, rotatably held at one end of a pivotable V-shaped crank 63, is biased against the periphery of cam 61 by a tension spring 66. Spring 66 is fixed between crank 63 and a frame side plate 26 to assure continuous contact between cam 61 and follower 62. As cam 61 is rotated with shaft 28, follower 62 is raised or lowered by the cam surface in an arc about the axis of a pivot pin 64 at the vertex of the V-shaped crank 63. A connecting rod 65 is pivotably fixed at one end to carriage 25 and at the other to the free end of crank 63. The pivotal motion of crank 63 in response to rotation of cam 61 is transmitted to carriage 25 by rod 65.

Figure 4:
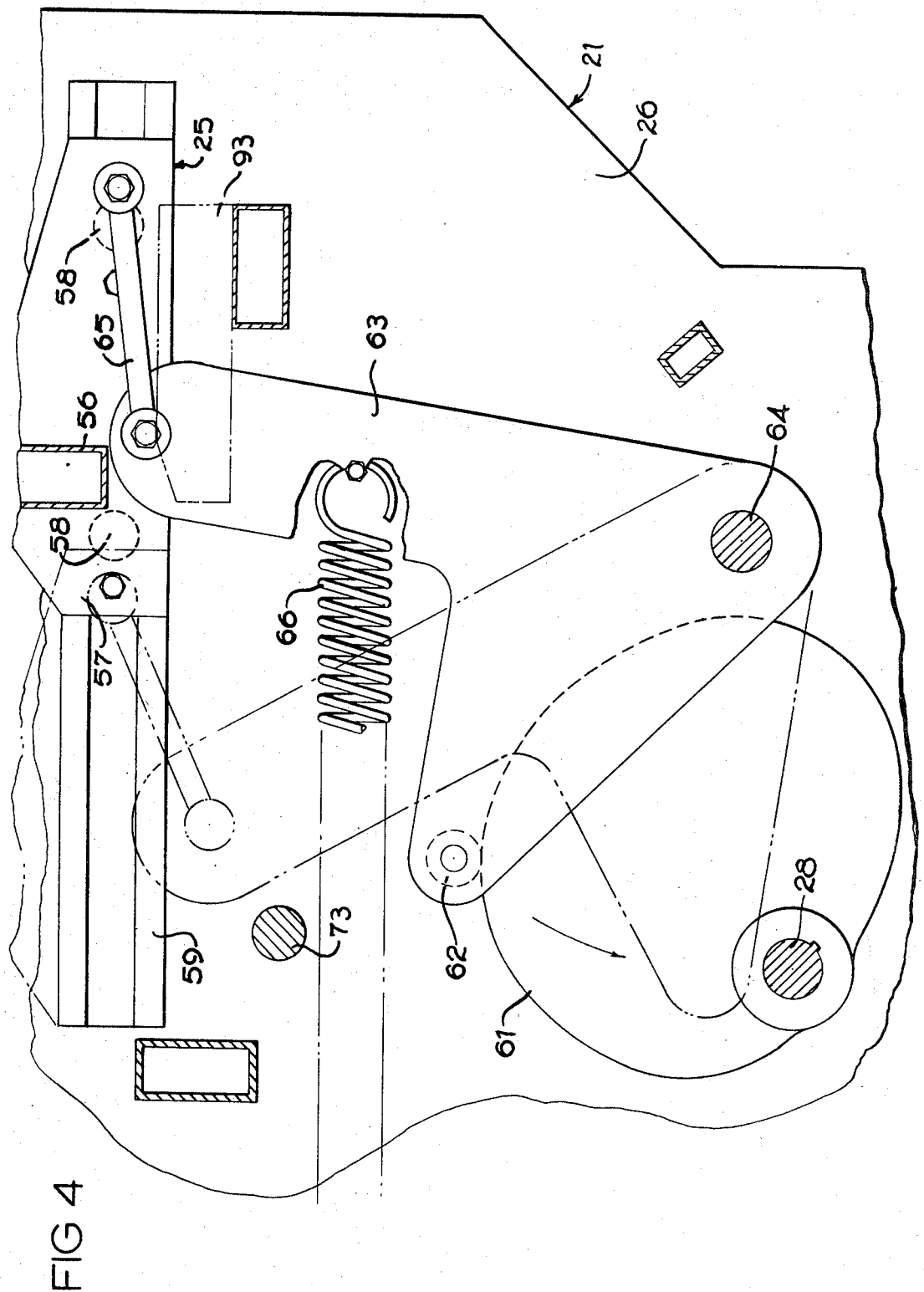
FIG. 4 is an enlarged fragmentary elevational section taken along lines 4—4 in FIG. 1.

Carriage 25 reciprocates on tracks 59 between the outward extended position shown in dashed lines in FIG. 4, where capsules are grasped by clip assemblies 24, and an inward retracted position shown in solid lines in FIG. 4, where clips 24 are operated to release the capsules.

Cam 61 is angularly positioned on shaft 28 relative to the position of cam 22 so that the nested stacks of capsules are indexed inwardly as carriage 25 reaches its extended position.

Figure 10:
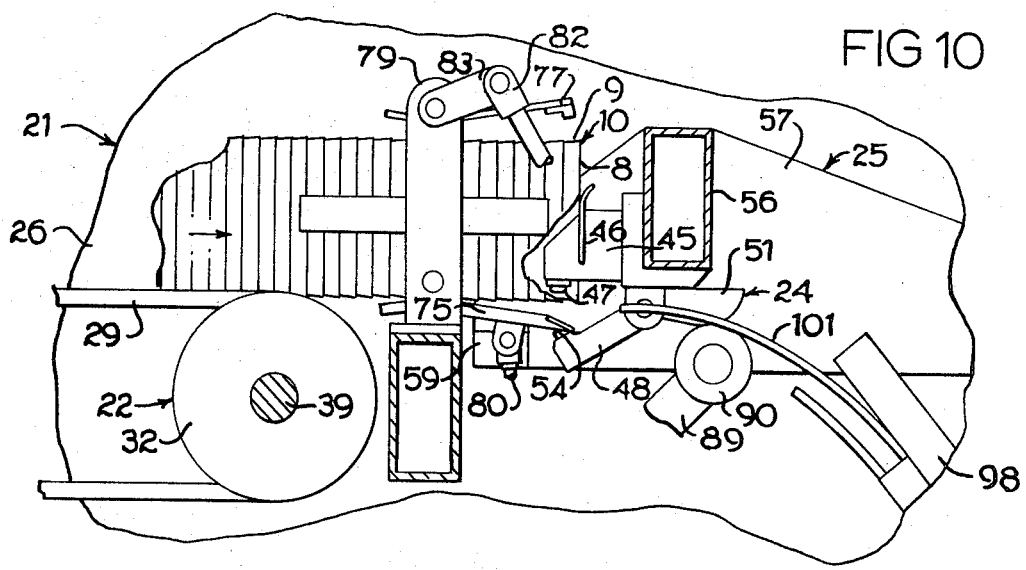
FIGS. 10–14 are fragmentary sectional diagrammatic views illustrating the operational cycle of the applicator.
Figure 11:
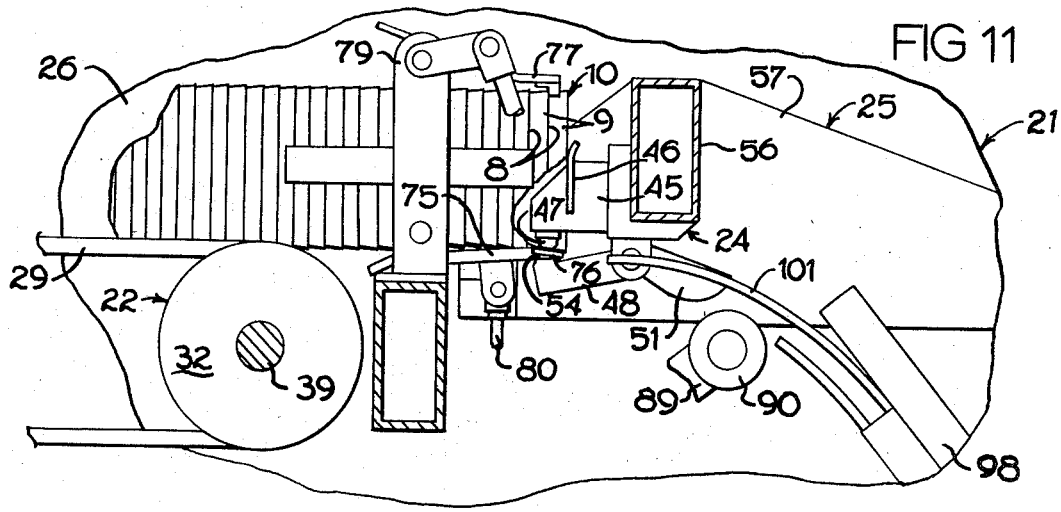

FIG. 10 illustrates a typical clip assembly 24 at the extended position of carriage 10 and the resultant position of the nested stack of capsules 10. As the stack is indexed inwardly by supply conveyor 22, the innermost capsule edge 8 abuts a vertical stop plate 46 on upper clip member 45.

Figure 5:
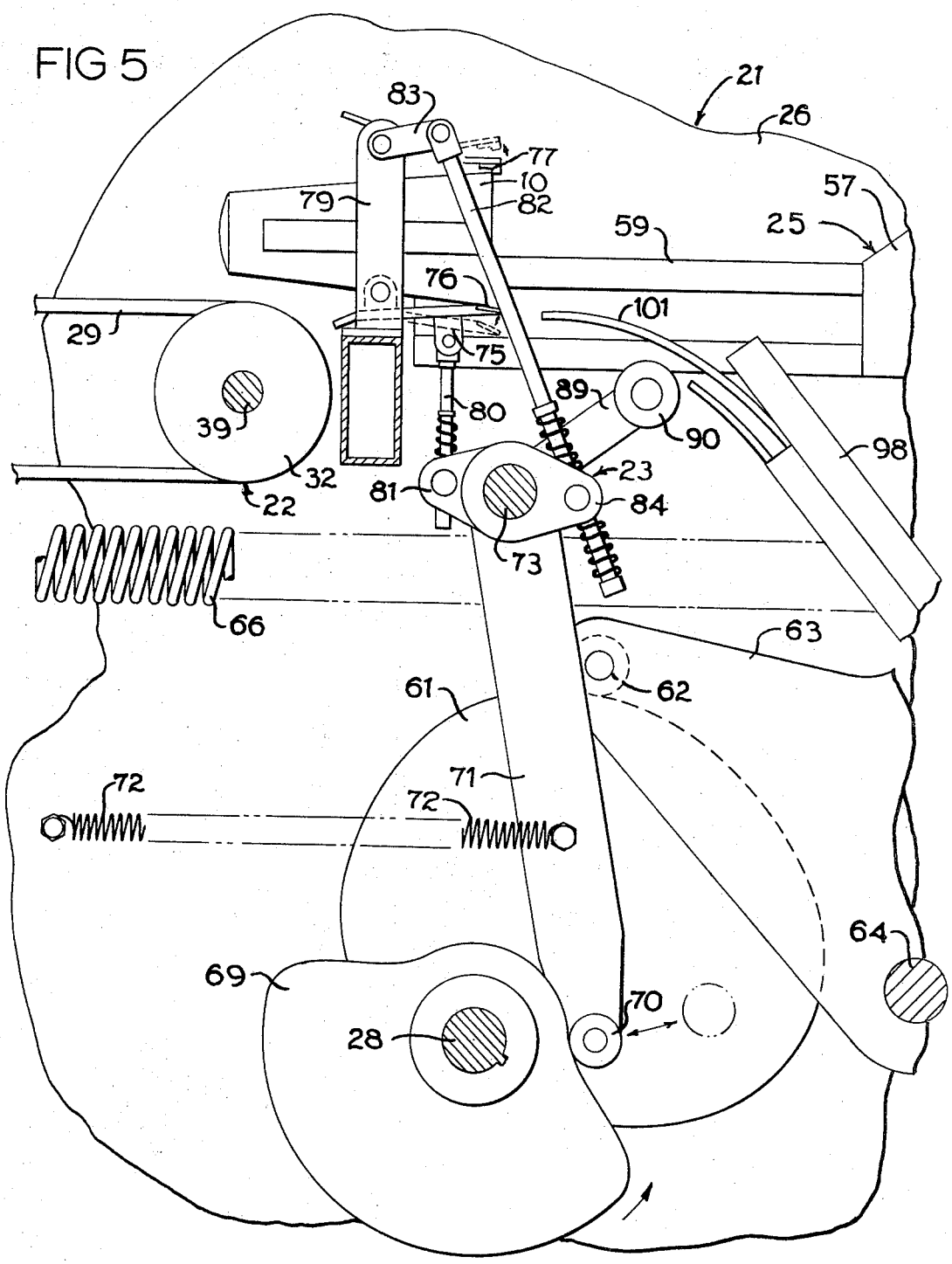
FIG. 5 is an enlarged fragmentary sectional view taken along line 5—5 in FIG. 1.

It may be noted that lower member 48 at this point in the operational sequence of the machine, is in the open position described previously. The open position of member 48 is affected by a roller 90 located elevationally in the path of member 48 by operation of a capsule stop and release assembly 23 (FIG. 5). A cam 69 is mounted on shaft 28 to pivot a follower 70 and follower arm 71 about the longitudinal axis of a lifter pivot shaft 73. Roller 90 is fixed to shaft 73 by an angular extension arm 89.

Can 69 is rotated by drive shaft 28 to pivot follower 70 to the raised position shown in dotted lines in FIG. 5, and back to the lowered position shown in solid lines, in an arc about the axis of shaft 73. Follower 70 is biased against the periphery of cam 69 by a tension spring 72 connected between follower arm 71 and a frame side plate 26.

As follower 70 is pivoted in response to rotation of cam 69 roller 90 also moves into and out of the path of lower clip member 48. The angular placement of cam 69 on shaft 28 is such that roller 90 is pivoted upwardly into the path of member 48 as it moves to the extended position. A dwell section on cam 69 maintains roller 90 in the upward position as member 48 is engaged, and pivoted upwardly to the open position. Carriage drive cam 61 also reaches a dwell period at the extended position, leaving carriage 25 momentarily stationary. It is during this dwell period that the capsule supply means is actuated by cam 34 to index the innermost capsules of the adjacent nested stacks into abutment against stops 46 of complementary clip assemblies 24.

After the indexing operation of the capsule supply means, rollers 90 are pivoted downwardly by cam 69. Clip members 48 are thereby allowed to pivot upwardly against lower members 75 of capsule release assemblies 23.

Capsule release assemblies 23 each include an upper pivotable capsule stop arm 77 and lower pivotable member 75. Both are operatively connected to pivot shaft 73 (FIG. 5) to be operated by rotation of cam 69. Capsule stop arm 77 is pivotably mounted elevationally above arm 75 to an upright bracket 79. Bracket 79 is affixed to a longitudinal bar adjacent drive pulleys 32 of supply conveyor 22. A connecting rod 82 is pivotably fixed between a collar 84 and one end of an intermediate crank arm 83. The other end of arm 83 is fixed to stop arm 77 at its pivot axis. Lower member 75 is also pivotably mounted to bracket 79 and projects inwardly between upper and lower clip members 45 and 48 at the extended position of clip assemblies 24 (FIG. 10,11). A second connecting rod 80 extends downwardly from member 75 to pivotably connect to a second collar 81.

Figure 12:
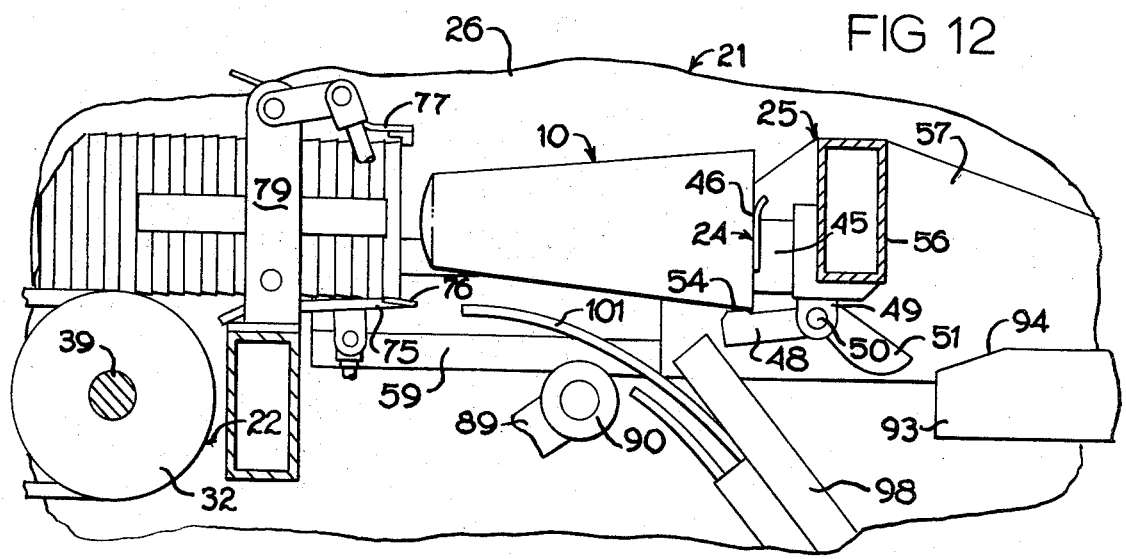

Both collars 84, 81 are rigidly fixed to shaft 73 for movement in response to rotation of cam 69. The resultant pivotal positions of member 75 and arm 77 are shown in FIG. 5 in dotted and solid lines. The dotted positions indicate an open condition as may be facilitates easily seen in FIG. 10. This open condition facilitateas inward indexing of the nested stack of capsules. The closed position, shown in solid lins in FIGS. 5, 11, and 12 accomplishes two objectives. First, upper stop arm 77 is lowered to engage the edge 8 of the capsule 10 directly adjacent the innermost capsule. Stop arm 77 thereby aids to stop further inward movement of the stack as the innermost capsule is withdrawn (FIG. 12). Secondly, lower member 75 presents a friction pad 76 at its inner end for overlappingly engaging the outer walls of the two innermost capsules of the stack. Pad 76 is pivoted upwardly and is gripped between clip members 45, 48 (FIG. 11) as roller 90 is pivoted from engagement with clip member 48. The coefficient of friction presented by the capsule engaging surface of pad 76 is considerably less than that of friction pad 47 engaging the inside wall of the capsule. Further, frictional contact between the innermost capsule and the next adjacent capsule is less than that between the outer capsule wall and pad 76. Therefore, as the clip assembly is moved inwardly, the engaged capsule is drawn from the stack by the frictional contact between the inner capsule wall and pad 47. Friction pad 76, along with stop arm 77, prevents the stack from being pulled inwardly as the inner capsule is withdrawn. Pad 76 also prevents withdrawal of more than one capsule regardless of how tightly the capsules are nested together.

As the clip assembly 24 is moved inwardly, the capsule grip surface 54 on lower clip member 48 slides along the lower surface of member 75 until the engaged capsule is substantially clear of the stack. Surface 54 then slides from contact with member 75 to directly engage the capsule outer wall (FIG. 12). Thus engaged, the capsule is moved to the inward retracted position where it is released onto the capsule directing means.

Figure 13:
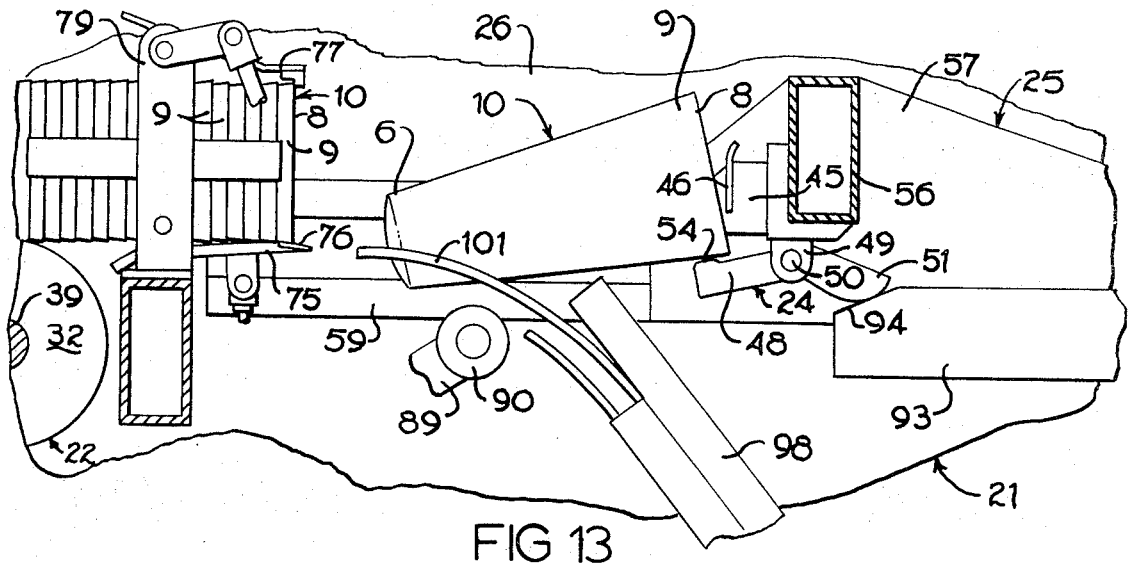

The capsule directing means serves to first grip the capsule, partly released by clip assembly 24, then direct it to gravitationally slide downward onto the neck of a bottle 16 below (FIGS. 13 and 14).

As carriage 25 moves to the retracted position, clip members 24 are again opened as arms 51 engage stationary inclined surfaces 94 of clip opener blocks 93. The small ends 6 of the capsules are thereby allowed to drop downwardly to become engaged between longitudinally spaced, upwardly projecting pairs of prongs 101, (FIG. 13).

An inclined guide or chute 98 supports each pair of prongs 101 at its upper end. Chute 98 is aligned with the nested stack of capsules and extends angularly downward from an upper end adjacent the inner end of the stack, to a lower end elevationally above and aligned with a pre-positioned bottle 16.

The large end 9 of the capsule 10, as it moves completely free from engagement by clip assembly 24, then drops downwardly onto chute 98. This movement pivots small end 6 free from engagement between prongs 101. Capsule 10 is then free to gravitationally slide down chute 98, which is U-shaped in cross section, and onto a waiting bottle 16 below. The movement of capsule 10 along chute 98 is diagrammatically shown by dashed lines in FIG. 14.

While the specific operations of the structure has been described above, the general scheme may be best understood from a study of the operational cycle shown in FIGS. 10 through 14. These figures represent the operational sequence followed after a row of bottles have been positioned by feed worm 17.

At the beginning of the cycle, (FIG. 10) carriage 25 moves the clip assemblies 24 to the extended position. At this position, the nested stacks of capsules are indexed inwardly on supply conveyor 22 bringing the innermost capsules into engagement with clip assemblies 24.

The lower clip members 48 are allowed to close (FIG. 11) prior to retraction of carriage 25. As the carriage is retracted (to the right in FIG. 11) the innermost capsules 10 are engaged and pulled from the stacks (FIG. 12). Clip assemblies 24 are gradually opened as carriage 25 moves to its retracted position, by clip opener blocks 93. As assemblies 24 open, the small ends 6 of the capsules drop elevationally and are engaged between the prongs 101 of chutes 98 (FIG. 13). The enlarged ends 9 of the capsules then drop downwardly from engagement by clip assemblies 24 onto chutes 98. The freed capsules 10 then slide gravitationally down chutes 98 and onto bottles 16 below (FIG. 14).

After capsules 10 have been placed on bottles 16, a cycle is complete and feed worm 17 is again activated to move the covered bottles back onto initial conveyor 12 while simultaneously moving a subsequent group of bottles to the pre-selected positions. Once the bottles reach these positions, the above described operational cycle is repeated.

Various modifications can be readily recognized in the basic structure without deviating from its underlying principles. Therefore, only the following claims are intended to limit and restrict the scope of this invention.

What we claim is:

1. In an apparatus for placing a tapered circumferential article over the upper end of an upright bottle, container or similar product:

bottle conveyor means for locating an individual bottle in an upright position at a pre-selected location;

article directing means above the bottle position at said pre-selected location for gravitationally guiding a article engaged thereby downwardly onto an upright bottle at said pre-selected location;

article supply means for holding a nested stack of articles;

capsule gripping means for grasping an individual article in said stack and subsequently moving the article outward from the stack and into engagement with said article directing means;

and first control means operatively connected to said article gripping means for releasing each article grasped thereby following engagement of the article with said article directing means.

2. The apparatus as set out in claim 1,
    wherein said article directing means comprises an upwardly facing chute inclined downwardly toward a discharge end located adjacent the upper end of a bottle at said pre-selected location.

3. The apparatus as set out in claim 1, further comprising:

intermittently operable article stepping means operatively connected to said article supply means for sequentially advancing a nested stack of article to thereby locate an individual exposed article at one end of the stack for grasping thereof by the article gripping means.

4. The apparatus as set out in claim 1,
    wherein said article directing means comprises an upwardly facing chute inclined downwardly toward a discharge end located adjacent the upper end of a bottle at said pre-selected location;

said article supply means comprising a horizontal conveyor for supporting a nested stack of articles and intermittently advancing toward one end thereof where an individual exposed article is elevationally located upwardly adjacent to the upper end of the chute;

said article gripping means being movable horizontally over the chute between a first position at which it grasps the exposed article in the stack and a second position above the chute at which the gripping means is released by operation of the first control means.

5. In an apparatus for placement of a cup-shaped article over the upper end of a bottle, the article having conical flared walls terminating at an open circumferential inner edge:

a support framework;

a supply conveyor on said framework holding a stack of nested articles for intermittently moving the stack longitudinally inward on said framework in the direction of their inner edges;

a shuttle carriage movably mounted to said framework;

gripper means on said shuttle carriage adapted to grasp the exposed walls of the innermost article on said supply conveyor;

a downwardly inclined guide on said framework aligned with the supply conveyor and located elevationally beneath the shuttle carriage, said guide being directed to a station at the lower end of the guide at which a receiving bottle may be located;

and powered means operatively connected to said shuttle carriage and gripper means for sequentially moving the carriage to the stack of nested articles on said supply conveyor, operating said gripper means to grasp the exposed walls of the innermost article in the stack, retracting the carriage over the guide and releasing the gripper means to permit the grasped article to move gravitationally along the guide to the station at the lower end thereof.

6. The apparatus as set out in claim 5, wherein said gripper means comprises a mechanical clip having:

a first member including a first friction pad adapted to engage the inside surface of a article wall adjacent its inner edge;

a second member including a second friction pad adapted to engage the outside surface of a article wall adjacent its inner edge in opposed relation to the first friction pad;

one of said members being movably mounted to the shuttle carriage for movement of the friction pad therewith toward or away from the friction pad of the remaining member.

7. The apparatus as set out in claim 6 wherein said one member is spring biased to normally urge the friction pad thereon toward an operative position wherein it abuts the friction pad of the remaining member.

8. The apparatus as set out in claim 7 further comprising:

stationary means on said framework in the path of said one member and engaged by said one member when the shuttle carriage has retracted an article from the stack and moved over the guide for moving the friction pad of said one member apart from the friction pad of the remaining member to release an article grasped thereby.

9. The apparatus set out in claim 5 wherein said conveyor has an upper horizontal flight supporting the stack of nested articles;

and means operatively connected to the conveyor for moving the upper horizontal flight inwardly along the framework an incremental distance equal to the nested height of one article during each sequential movement of the shuttle carriage.

10. In an apparatus for placement of a cup-shaped article over the upper end of a bottle, the article having conical flared walls terminating at an open circumferential inner edge:

a support framework;

a horizontal bottle conveyor on the framework;

bottle indexing means on the framework for selectively locating a bottle on said conveyor in a fixed upright position at an article receiving location;

an inclined article chute mounted to the framework and having an upwardly facing surface leading from an elevated upper end to an elevationally lower discharge end positioned so as to gravitationally direct a downwardly open article on said surface onto a bottle at the capsule receiving location;

a carriage mounted on the framework above the chute for reversible movement along a path aligned with the chute;

article supply means on said conveyor for supporting a horizontal stack of nested articles and locating individual articles at one end of the stack with the article open edge facing the carriage;

a selectively-operable grip on the carriage facing toward the article supply means and adapted to engage the walls of a single article for transport by said carriage;

and power means on the framework connected to the carriage for moving it between a first position at which the grip is in engagement with an article at said one end of a stack as located by said article supply means and a second position at which an article grasped by the grip overlies the upper end of the chute.

11. The apparatus as set out in claim 10 further comprising:

first operating means engageable with the grip for causing the grip to engage the walls of an article following movement of the carriage to said first position.

12. The apparatus as set out in claim 11 further comprising:

second operating means engageable with the grip for causing the grip to release its grasp of the walls of an article as it reaches the second position during movement from the first position.

13. The apparatus as set out in claim 12 wherein said power means moves the carriage from said first position to a location on the framework beyond said second position;

and article retarding means at the upper end of the chute for frictionally engaging articles as it is released by the grip at the carriage second position.

* * * * *